Patented Oct. 28, 1930

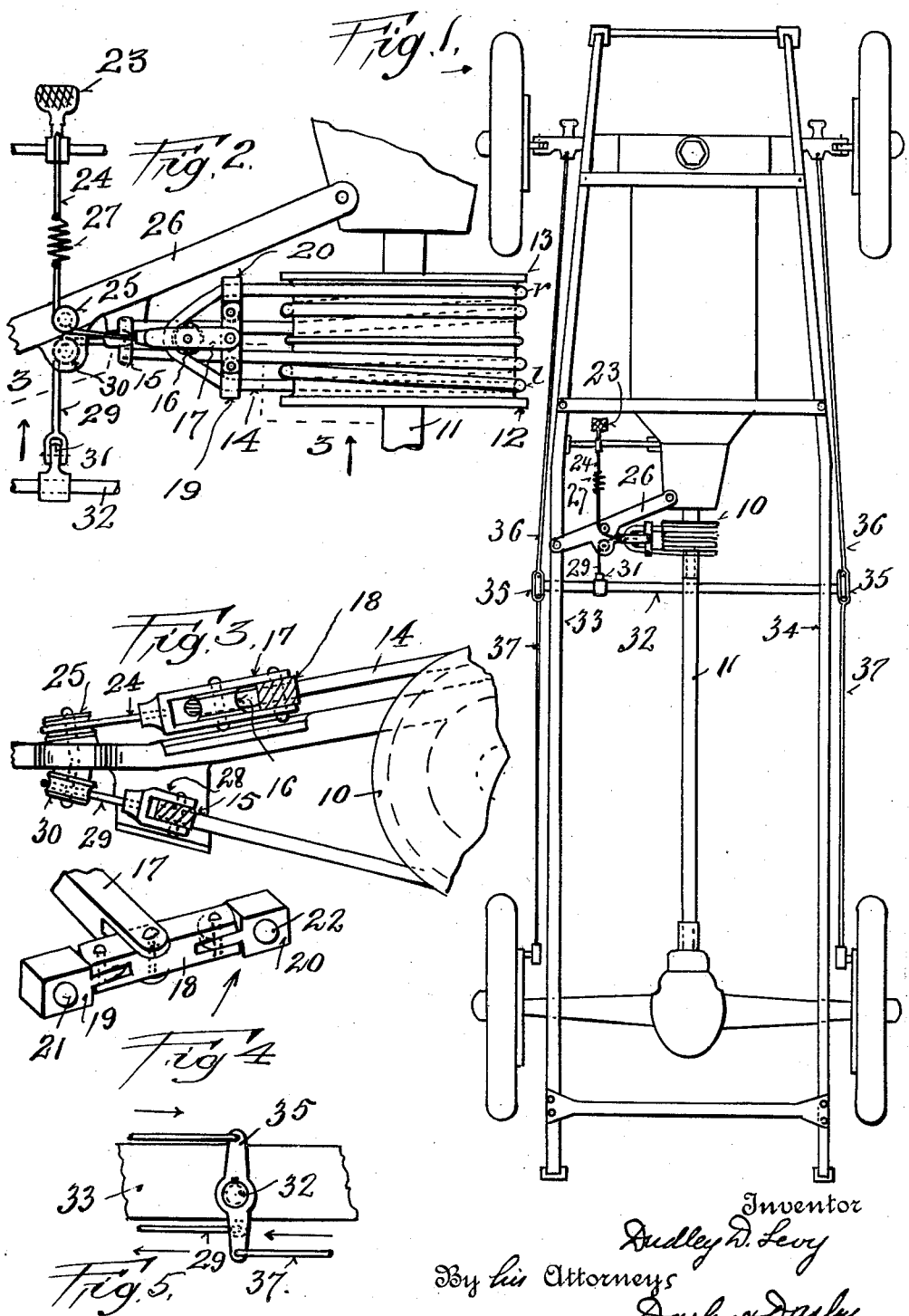

1,779,630

UNITED STATES PATENT OFFICE

DUDLEY D. LEVY, OF NEW YORK, N. Y.

BRAKE MECHANISM

Application filed April 13, 1928. Serial No. 269,641.

This invention relates to brake mechanism which is adapted primarily for automotive vehicles, but is applicable also for other purposes.

The object of my invention includes the provision of simple but efficient means for applying the brakes in automobiles or the like.

My invention further contemplates the provision of means for the utilization of momentum derived from a moving body and its parts and converting it into brake energy.

Another object of my invention includes the provision of a brake operating mechanism which can be readily applied and which is highly effective for braking, not only light pleasure cars, but more particularly heavy trucks and buses.

I further provide a rotating part, or journal, as, for example, the drive shaft in automotive vehicles, with a drum which is fastened to rotate with said journal and over which is wound an operating cable for transforming rotative energy into brake energy to thereby set the brake shoes or equivalent mechanism used as brake means.

Other objects will appear hereinafter and I attain these objects by the construction illustrated in the accompanying drawing, in which Figure 1 is a plan view of an automobile chassis having my invention applied thereto, Fig. 2 is an enlarged plan view showing my mechanism in detail, Fig. 3 is a view taken on the line 3—3 of Fig. 2, Fig. 4 is a view in perspective of the brake cable guide, and Fig. 5 is a view showing the application of my device attached to the brake equalizer.

Like numerals of reference refer to similar parts throughout the several views.

Referring now to the drawing, I have shown in Figure 1 an automobile chassis of standard construction to which my invention has been applied. It will be noted that my brake device or energy transmitting mechanism is relatively very simple and can be readily applied to an automotive vehicle without any material changes in the standard brake mechanism. In fact my new and improved device is inserted between the foot pedal and the brake equalizer and the foot pedal is operated as heretofore with this difference; in the old type of brake mechanism the depression of the foot pedal merely rocked the equalizer and applied the brakes to the brake drums of the wheels. With my improved device on the other hand, the depression of the foot pedal places into operation an energy transforming device which adds very materially to the brake applying action, because of the inertia of the rotating drum and journal.

Obviously the size of the friction drum and the number of cable turns on said drum will influence the effectiveness of my device and an increase in the diameter of the drum or in the number of cable turns will exert a tremendous influence on the brake applying power of my device, so that the heaviest trucks and biggest buses are thereby brought under easy control of the foot brake.

In a preferred form of construction my invention embodies the use of suitable energy transferring mechanisms, which, in a specific instance, includes a drum 10, cable 14 and associated parts to be more fully described below.

The drum 10 is fastened on the drive journal 11 so as to rotate therewith and it is provided with flanges 12 and 13 to guide or maintain the several windings ($r$ and $l$) of the operating or friction cable 14 on the drum surface. One side (starting from the U-shaped mid portion) of this cable, indicated by the letter $r$, is wound right handed over the drum by a suitable number of turns. The other side indicated by $l$, is wound left handed or under the drum by a suitable number of turns and the ends of the windings, $r$ and $l$, are swedged or otherwise fastened in the evener bar 15. The mid or U-shaped portion of cable 14 passes over a pulley 16 in the tackle block 17. In one end of this block there is pivotally mounted an equalizer 18 having equalizer blocks 19 and 20 swingably mounted therein. These blocks are each provided with a hole 21 and 22 respectively through which cable 14 is allowed to pass freely back and forth when the device is operating by reason of the foot pedal 23 being depressed to exert a pull on the tackle block 17 by means of cable 24.

This cable passes over a pulley 25 on frame 26 and is provided with a spring 27 to prevent excessive application of the cable on the drum by reason of the pedal being depressed too suddenly or too hard so that the cable will not lock on the drum. Spring 27 is shown at a convenient place in cable 24 but obviously it might be placed at other points if desirable.

Attached to the evener bar 15 by a clevis 28 is the brake cable 29. This cable extends at an angle over a pulley 30 to the rocker lever 31 on the rockshaft 32 which is mounted to rock in the frame members 33 and 34. On the ends of this bar is fixedly held the double lever brake link 35. This link is provided with holes or other means near the ends thereof, in the upper of which is held the forward brake tension rod 36 and in the lower lever hole is held the rear brake tension rod 37. These rods extend to operate the brakes on the front and rear wheels in the known manner.

In the construction described above, which is given by the way of illustration and not in a limiting sense, the action of my brake device is substantially as follows:

When the foot pedal is depressed this action is transmitted through cable 24 and tackle block 17 to the operating friction cable 14, which is thus tensioned on the rotating friction drum, assuming that the car (or a shaft) is moving, and the drum rotating. This tensioning of the cable on the rotating drum will cause the cable to grip the drum and to rotate with it. Since, however, one side of the cable is a right hand winding (*r*) over the drum and the other is a left hand winding (*l*) under the drum, one of said windings will tighten while the other will loosen on the drum rotating in either direction. That is, the brake operating mechanism will become effective on either forward or backward movement of the vehicle.

In the mechanism herein illustrated I have shown two turns for each winding. Obviously the effective brake factor may be varied by the number of turns as well as by the diameter of the drum.

The spring in the pedal cable takes up the shocks and modifies the effect of too sudden application of the pedal. It serves also to take all the pressure when the drum is at rest.

While I have shown and described my device or mechanism as being applied to automotive vehicle, it is understood that the same is applicable to rotating shafts and pulleys as a means of controlling moving parts, and in the application of said mechanism to automobiles the brake power of the foot pedal is increased by the momentum of the car and the rotating drive shaft and friction drum.

Having now described my invention what I claim as new and useful and desire to secure by Letters Patent is:

1. In a brake mechanism, the combination of a rotating member having a friction surface and a flexible member engaging said surface by oppositely wound coils.

2. In a brake mechanism, the combination of a rotating member having a friction surface, a flexible member engaging said surface by oppositely wound coils, and means for tensioning said flexible member on said surface moving in either direction.

3. In a brake mechanism, the combination of a rotating member having a friction surface, a flexible member engaging said surface by oppositely wound coils, and means for tensioning one of said oppositely wound coils during the rotation of said friction surface in either direction.

4. In a brake mechanism, the combination of a rotating member and a drum mounted to rotate with said member, an energy transferring device having drum engaging means operative when the drum rotates in either direction and means for rendering effective said energy transferring device.

5. In a brake applying mechanism, a rotatively mounted member and a drum on said member, a movable member having parts including reversely wound cable loops to engage said drum rotating in either direction.

6. In a brake applying mechanism, a drum having a friction surface and a cable wound on said drum in opposite directions for tightening one of said coils and loosening the other on the drum rotating in either direction and means for tensioning said cable to render effective said brake applying mechanism.

7. In a brake applying mechanism, a drum having a friction surface for receiving brake applying means, said means comprising reversely wound cable loops on said drum, and means engaging said brake applying means for rendering effective said brake applying mechanism when the drum rotates in either direction.

8. A brake operating mechanism, comprising a tackle block having swingable members and a rotatable member, a cable folded on said rotatable member and engaging said swingable members, a rotating member over which said cable is coiled in opposite directions, means for tensioning said cable fold, and means for transmitting the tensioning effects to a brake lever in the brake operating mechanism.

In testimony whereof I have hereunto set my hand on this 9th day of April A. D., 1928.

DUDLEY D. LEVY.